United States Patent
Chen et al.

(10) Patent No.: US 10,520,678 B1
(45) Date of Patent: Dec. 31, 2019

(54) FIBER ARRAY UNIT AND FIBER ARRAY APPARATUS HAVING THE SAME

(71) Applicant: Fujin Precision Industrial (Jincheng)Co., Ltd., Jincheng (CN)

(72) Inventors: Wu-Kuang Chen, New Taipei (TW); Shin-Lo Chia, Fremont, CA (US); Zhi-Ming Li, Shenzhen (CN); Le-Peng Wei, Shenzhen (CN)

(73) Assignee: Fujin Precision Industrial (Jincheng)Co., Ltd., Jincheng (CN)

( * ) Notice: Subject to any disclaimer, the term of this patent is extended or adjusted under 35 U.S.C. 154(b) by 0 days.

(21) Appl. No.: 16/145,236

(22) Filed: Sep. 28, 2018

(30) Foreign Application Priority Data

Jun. 20, 2018 (CN) .......................... 2018 1 0638426

(51) Int. Cl.
  *G02B 6/42* (2006.01)
  *G02B 6/00* (2006.01)
  *G02B 6/36* (2006.01)

(52) U.S. Cl.
  CPC ......... *G02B 6/3636* (2013.01); *G02B 6/4242* (2013.01); *G02B 6/4257* (2013.01)

(58) Field of Classification Search
  CPC .................................. G02B 6/42; G02B 6/00
  USPC ........................................................ 385/59
  See application file for complete search history.

(56) References Cited

U.S. PATENT DOCUMENTS

| 4,046,454 | A | * | 9/1977 | Pugh, III | G02B 6/3636 385/59 |
| 5,548,677 | A | * | 8/1996 | Kakii | G02B 6/262 385/92 |
| 6,681,473 | B1 | * | 1/2004 | Liu | G02B 6/3644 29/458 |
| 6,950,570 | B1 | * | 9/2005 | Novotny | G02B 6/3588 385/16 |
| 2001/0036352 | A1 | * | 11/2001 | Kadar-Kallen | G02B 6/2937 385/136 |
| 2002/0097957 | A1 | * | 7/2002 | Kikuchi | G02B 6/327 385/33 |
| 2003/0012544 | A1 | * | 1/2003 | Matsumoto | G02B 6/3676 385/137 |
| 2003/0142946 | A1 | * | 7/2003 | Saito | G02B 6/12009 385/137 |
| 2004/0005111 | A1 | * | 1/2004 | Ishikawa | G02B 6/3582 385/16 |

(Continued)

FOREIGN PATENT DOCUMENTS

| JP | 2003344688 A | 12/2003 |
| JP | 2004145118 A | 5/2004 |

(Continued)

*Primary Examiner* — Kaveh C Kianni
(74) *Attorney, Agent, or Firm* — ScienBiziP, P.C.

(57) ABSTRACT

A high-density fiber array unit includes a plurality of substrates arranged and connected in an array, a side plate arranged at one side of the plurality of substrates and connected to one of the plurality of substrates, and a plurality of fibers. Each substrate comprises a first surface and a second surface opposing the first surface, and the first surface defines positioning grooves. The side plate is connected to the first surface of one of the substrates, and each fiber can be fixed to and held by a positioning groove. A fiber array apparatus including the fiber array unit is also provided.

10 Claims, 6 Drawing Sheets

(56) References Cited

U.S. PATENT DOCUMENTS

| | | | | |
|---|---|---|---|---|
| 2004/0086231 A1* | 5/2004 | Fukuyama | ............ | G02B 6/3636 385/49 |
| 2004/0184729 A1* | 9/2004 | Martin | ................. | G02B 6/3582 385/33 |
| 2004/0190851 A1* | 9/2004 | Garner | ................. | G02B 6/3672 385/137 |
| 2006/0291782 A1* | 12/2006 | Carpenter | ................ | G02B 6/30 385/49 |
| 2007/0101549 A1* | 5/2007 | Sumi | ................... | B01J 19/0046 19/144 |
| 2008/0068719 A1* | 3/2008 | Hayashi | ............... | G02B 3/0043 359/622 |
| 2009/0010603 A1* | 1/2009 | Sugioka | .................. | C08K 3/22 385/123 |

FOREIGN PATENT DOCUMENTS

| | | |
|---|---|---|
| JP | 4106616 B2 | 6/2008 |
| TW | 201248227 A | 12/2012 |
| WO | 2006/137451 A1 | 12/2006 |

\* cited by examiner

FIBER ARRAY UNIT AND FIBER ARRAY APPARATUS HAVING THE SAME

FIELD

The disclosure generally relates to optical fiber communications.

BACKGROUND

Fiber array units may include a plurality of fibers. A conventional fiber array unit includes a substrate, a cover plate on the substrate, and a plurality of optical fibers arranged between the substrate and the cover plate. The substrate defines a plurality of positioning holes, and each optical fiber is positioned in one positioning hole. In the conventional fiber array units, there may be 2 to 64 optical fibers.

BRIEF DESCRIPTION OF THE DRAWINGS

Many aspects of the present disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as coupled, whether directly or indirectly through intervening components, and is not necessarily limited to physical connections. The connection can be such that the objects are permanently coupled or releasably coupled. The term "comprising" when utilized, means "including, but not necessarily limited to"; it specifically indicates open-ended inclusion or membership in the so-described combination, group, series, and the like.

Figure 1:
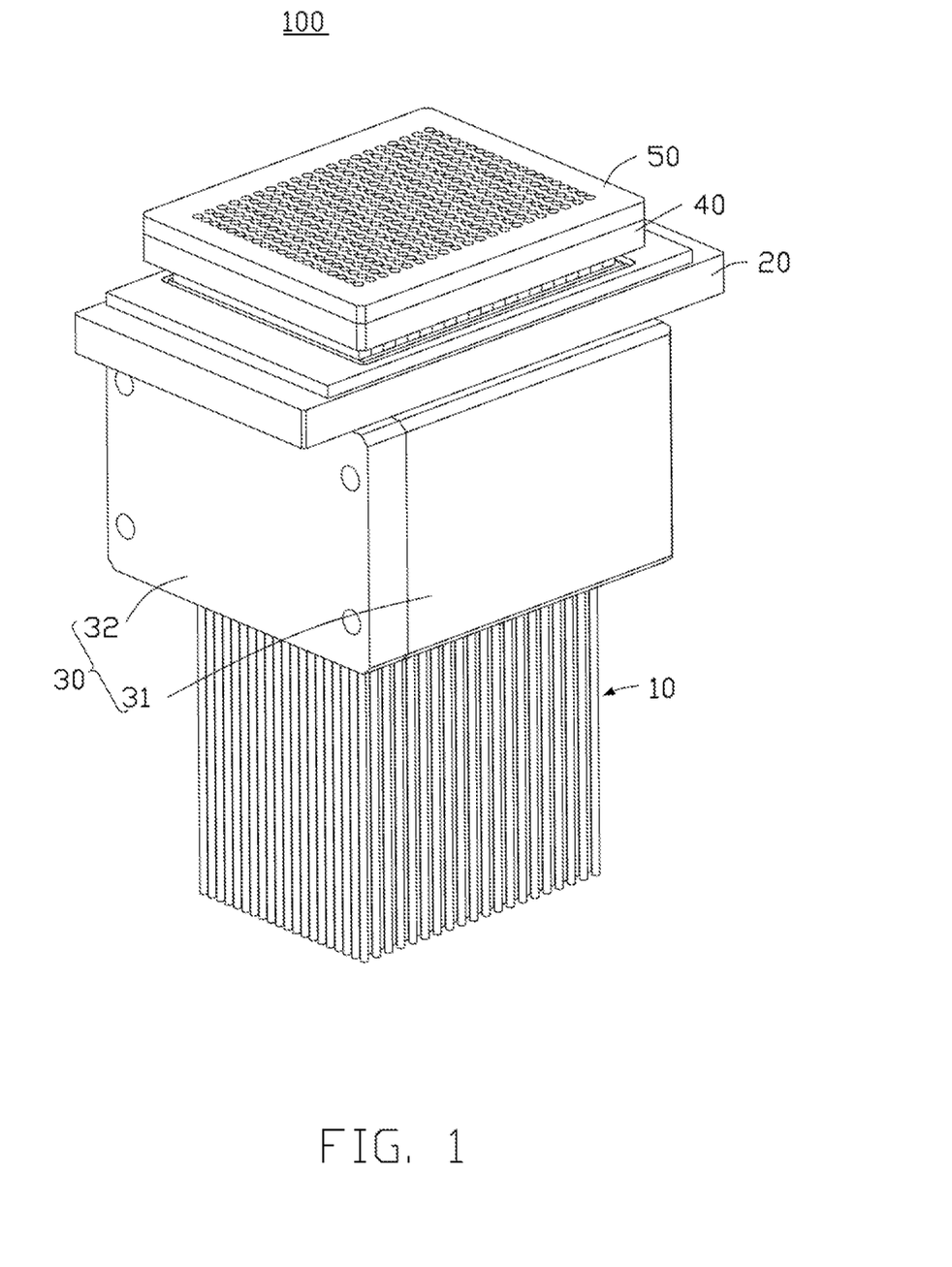
FIG. 1 is an isometric view of an embodiment of a fiber array apparatus.

FIG. 1 shows an embodiment of a fiber array apparatus 100 according to the present disclosure. The fiber array apparatus 100 may include a fiber array unit 10, a packaging plate 20, a protective cover 30, a spacing plate 40, and a lens plate 50. The fiber array unit 10 is mounted on the packaging plate 20. The protective cover 30 can be coupled to the packaging plate 20 and surrounds the fibers (not labeled) of the fiber array unit 10. The protective cover 30 may include a first cover 31 and a second cover 32 connected to the first cover 31. The spacing plate 40 can be connected to one side of the packaging plate 20 away from the fiber array unit 10, and the lens plate 50 can be connected to one side of the spacing plate 40 away from the packaging plate 20.

Figure 2:
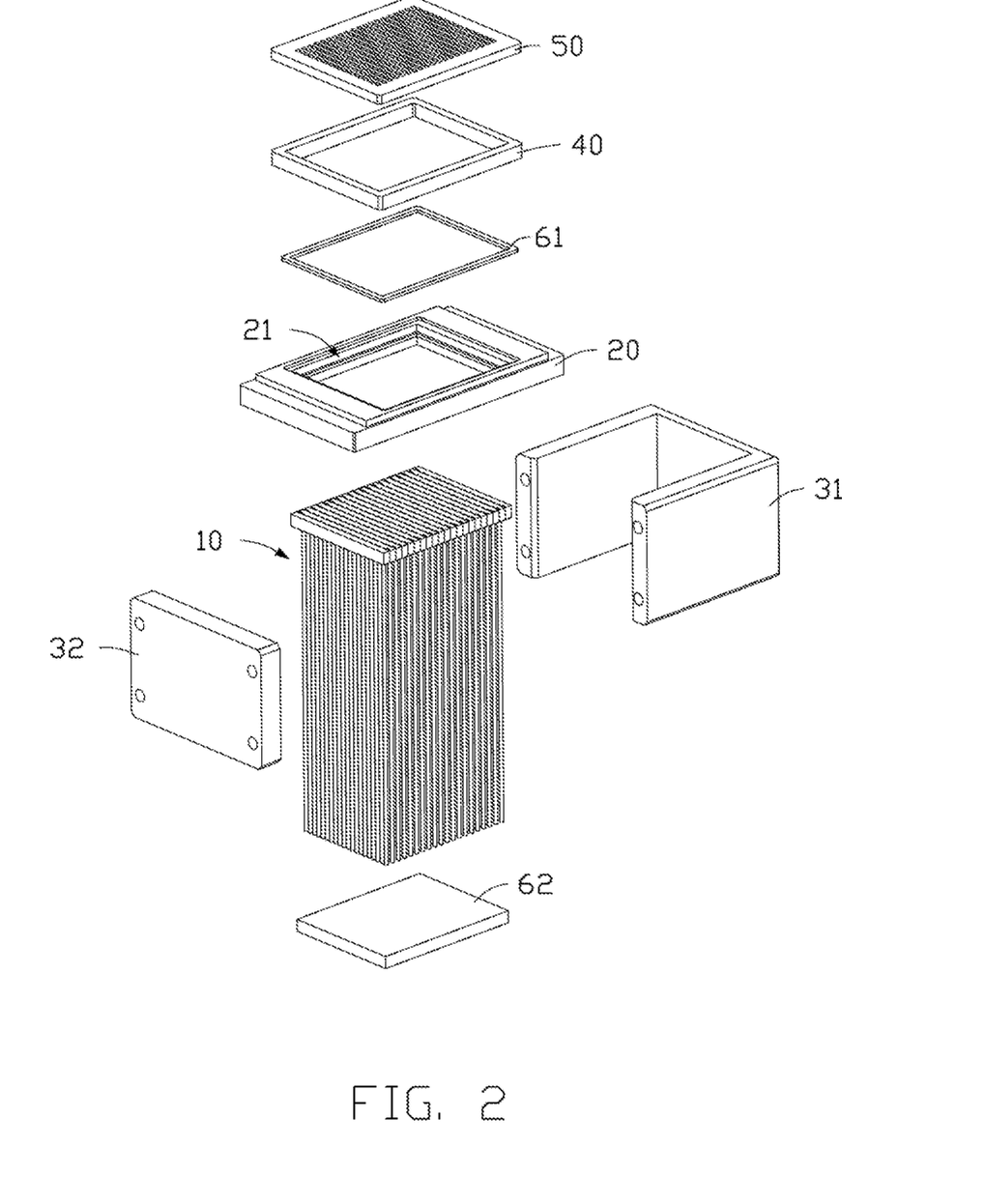
FIG. 2 is an exploded isometric view of the fiber array apparatus of FIG. 1.

FIG. 2 illustrates that the packaging plate 20 can be substantially rectangular. The packaging plate 20 can define a through hole 21 for mounting the fiber array unit 10. The through hole 21 can be defined at the central portion of the packaging plate 20, and the through hole 21 can be rectangular.

The first cover 31 can be a cover substantially in shape of a U, the second cover 32 can be a rectangular plate. In other embodiments, the first cover 31 and the second cover 32 can have other shapes, as long as both the first cover 31 and the second cover 32 cooperatively surround a portion of the fiber array unit 10. For example, both of the first cover 31 and the second cover 32 can be U-shaped covers that surround the fiber array unit 10. In at least one embodiment, the first cover 31 can be connected to the second cover 32 by screws, and the first cover 31 and the second cover 32 can be connected to the packaging plate 20 by adhesive.

The spacing plate 40 can be a rectangular frame. The lens plate 50 can be rectangular and mounted to the packaging plate 20 through the spacing plate 40. In at least one embodiment, the spacing plate 40 can be connected to the packaging plate 20 by adhesive.

In at least one embodiment, the fiber array unit 10 can be fixed to the packaging plate 40 by adhesive. Thus, the fiber array apparatus 100 may further include a first adhesive layer 61 and a second adhesive layer 62. The first adhesive layer 61 can be rectangular and frame shaped. The first adhesive layer 61 may be arranged around a peripheral portion of the fiber array unit 10. The second adhesive layer 62 can also be rectangular and arranged at one side of the packaging plate 40 spaced from the spacing plate 40.

Figure 3:
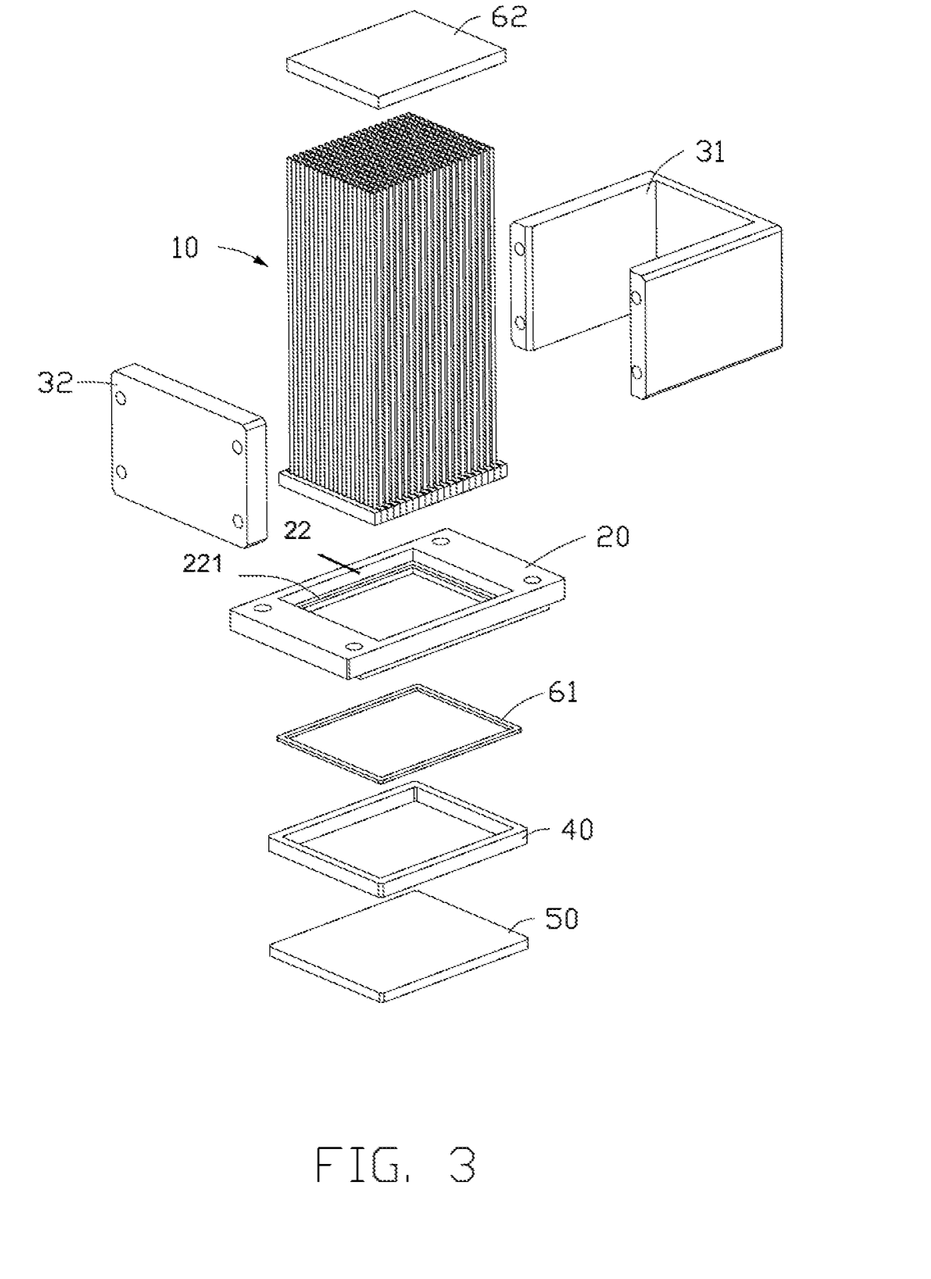
FIG. 3 is similar to FIG. 1, but viewed from another angle.

FIG. 3 illustrates the packaging plate 20 may have an inner sidewall 22 defining the through hole 21, the packaging plate 20 includes a frame 221 extending from the inner sidewall 22 of the packaging plate 20 towards the through hole 21. The fiber array unit 10 and the first adhesive layer 61 can be mounted on the frame 221, and a portion of the fiber array unit 10 can be surrounded by the first adhesive layer 61.

Figure 4:
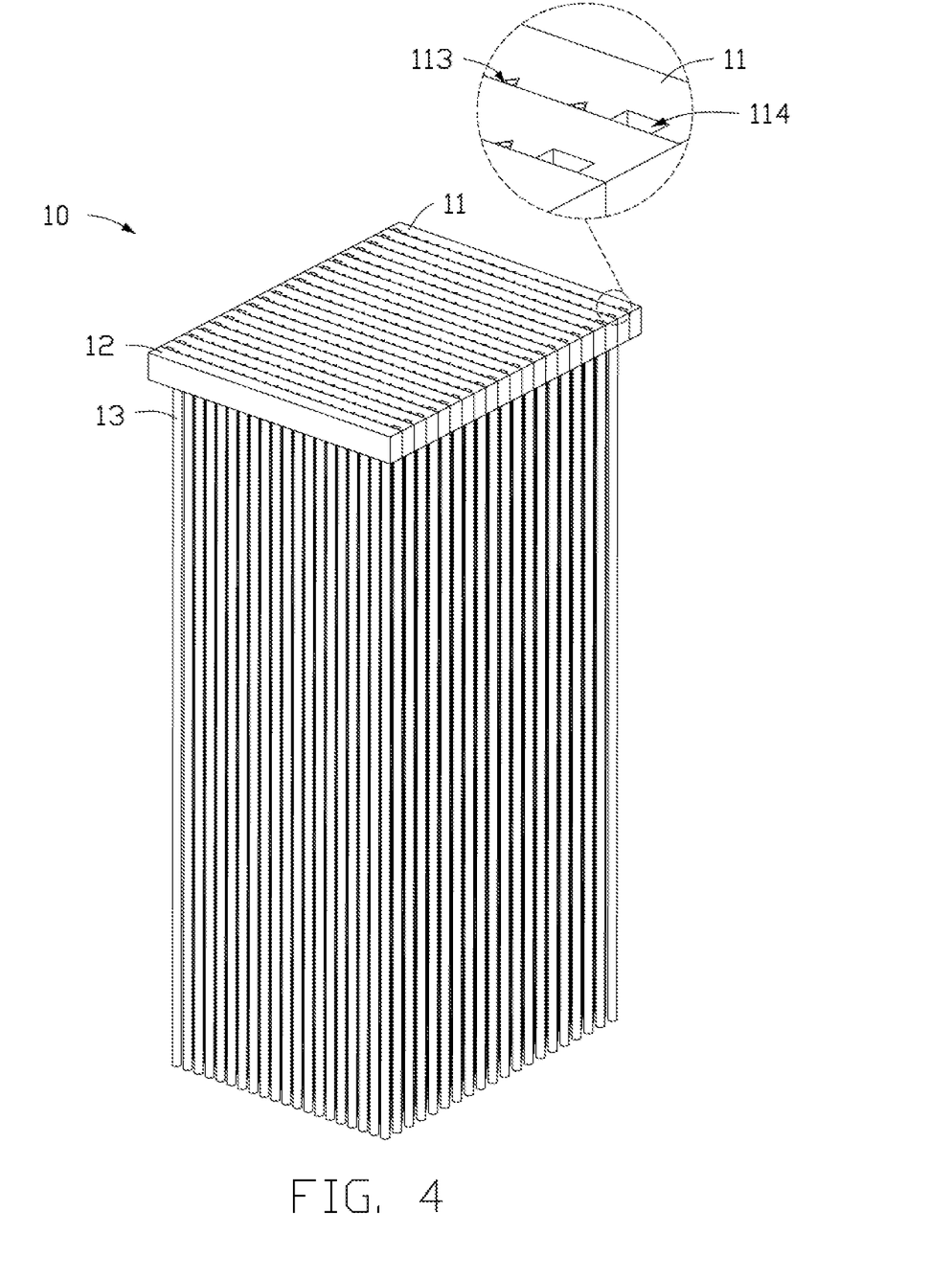
FIG. 4 is an isometric view illustrating a fiber array unit of the fiber array apparatus of FIG. 1.
Figure 5:
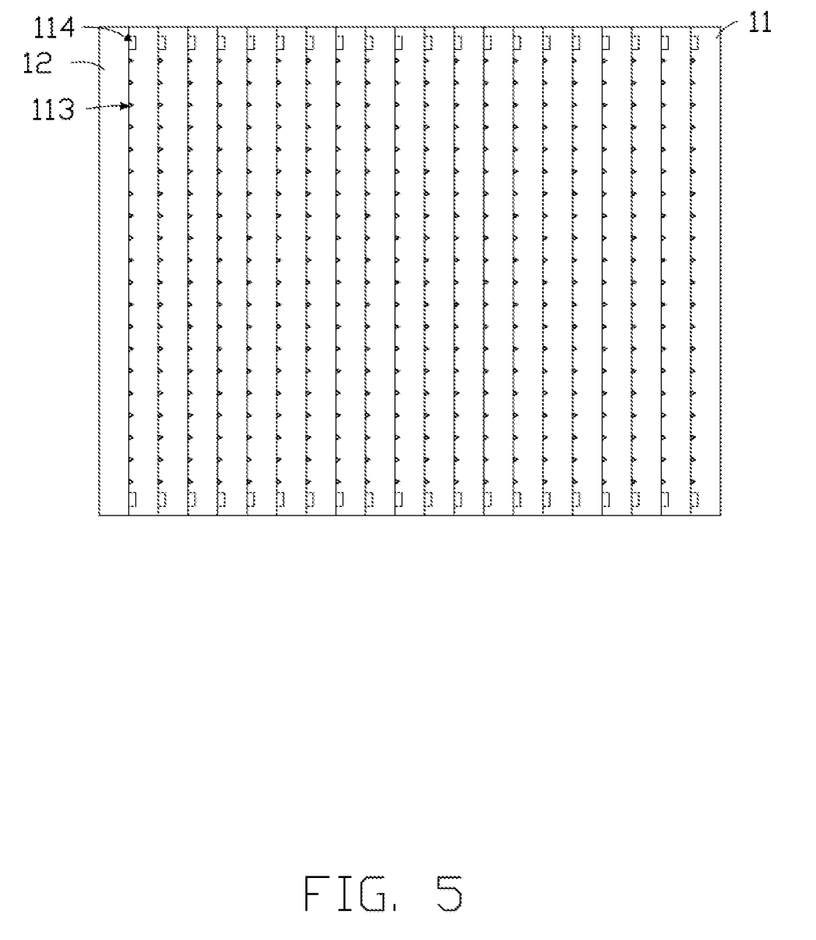
FIG. 5 is a top view of the fiber array unit of FIG. 4.

FIG. 4 illustrates that the fiber array unit 10 may include a plurality of substrates 11, a side plate 12, and a plurality of fibers 13. The plurality of substrates 11 can be parallel and connected in an array. The side plate 12 can be arranged at one side of the plurality of the substrates 11, and connected to one of the substrates 11. The side plate 12 can be a rectangular plate. The substrates 11 and the side plate 12 are surrounded by the first adhesive layer 61 (shown in FIG. 3). FIG. 5 illustrates the substrates 11 and the side plate 12 are arranged in a row.

Figure 6:
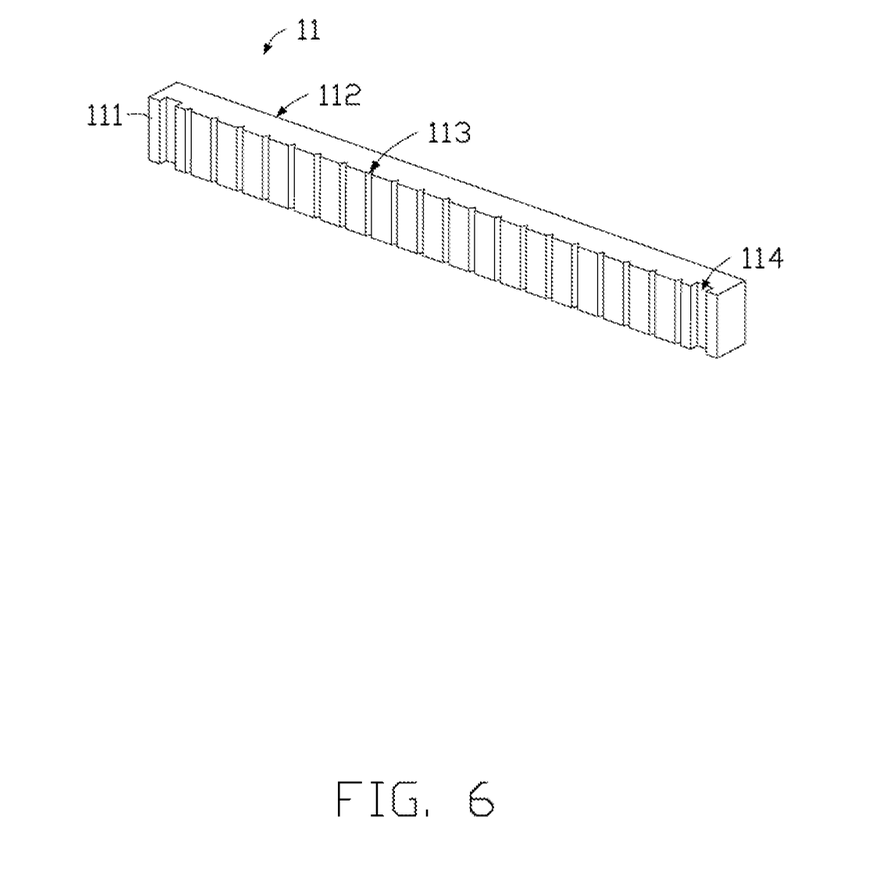
FIG. 6 is an isometric view illustrating a substrate of the fiber array unit of FIG. 4.

FIG. 6 illustrates that each of the substrates 11 may be substantially rectangular, and include a first surface 111 and a second surface 112 on an opposite side of the substrate 11 from first surface 111. At least a portion of the second surface 112 can be planar. The first surface 111 can define a plurality of positioning grooves 113 and at least one receiving groove 114. The positioning grooves 113 can be arranged in regular manner. In at least one embodiment, the positioning grooves 113 can be arranged substantially parallel and at equal spacing from one another. Each positioning groove 113 can have a V-shaped cross-section, configured for receiving one of the fibers 13. In other embodiments, the positioning grooves 113 can have circular, rectangular, or other cross-sections, as long as each positioning grooves 113 can receive and hold a fiber 13.

The at least one receiving groove 114 may be configured for receiving an adhesive (not shown). Thus, the substrates 11 and the side plate 12 can be attached to each other. In an embodiment, the first surface 111 defines two receiving grooves 114. The two receiving grooves 114 are defined at opposite sides of the first surface 111, and the plurality of the positioning grooves 113 are defined between the two receiving grooves 114. The receiving groove 114 have a rectangular cross-section. In other embodiments, the receiving grooves 114 can have circular, V-shaped, or other cross-sections. The width of the receiving groove 114 should be greater than the width of at least one positioning grooves 113 and in some embodiments, all the positioning grooves 113 have a same width.

FIG. 4 through FIG. 6 show the fibers 13 can be arranged in an array, with each fiber 13 mounted in a positioning groove 113. In at least one embodiment, each fiber 13 can be fixed in its corresponding positioning groove 113 by adhesive. A largest width of each positioning groove 113 should be greater than a diameter of the fiber 13 that is positioned within the groove 113. Therefore, the fiber 13 can be entirely received in its corresponding positioning groove 113.

The first surface 111 of each substrate 11 is connected to the second surface 112 of an adjacent substrate 11 or to the side plate 12. Thus, the positioning grooves 113 and the ends of the fibers 13 fixed in the positioning grooves 113 can be covered by the second surface 112 of the adjacent substrate 11 or the side plate 12.

In at least one embodiment, the fiber array unit 10 includes twenty substrates 11, each substrate 11 defining twenty positioning grooves 113. Therefore, the fiber array unit 10 can accommodate 400 fibers. In other embodiments, the number of the substrates 11, and the number of the positioning grooves 113 defined at each substrate 11 may vary.

In at least one embodiment, the adhesive can be UV-curable. In other embodiments, the adhesive can be heat curable or similar types of adhesives.

In other embodiments, the receiving grooves 114 can be defined at the second surface 112 of each substrate 11.

In other embodiments, the number of the receiving grooves 114 defined at each substrate 11 can be one or more.

In at least one embodiment, the first adhesive layer 61 can be frame shaped and surround the substrates 11 and the side plate 12. In other embodiments, the first adhesive layer 61 and the second adhesive layer 62 can form other shapes.

In some embodiments, each of the positioning holes 113 can be arranged at different intervals. In other embodiments, some, rather than all, the positioning holes 113 can be arranged at equal or different intervals.

In other embodiments, the positioning holes 113 defined on different substrates 11 can be staggered.

The fiber array unit 10 includes a plurality of substrates 11 connected one by one, a side plate 12 arranged at one side of the plurality of substrates 11 and connected to one of the plurality of substrates 11, and a plurality of fibers 13. Each substrate 11 includes a first surface 111 and a second surface 112 on the opposite side of the substrate 11 from first surface 111. The positioning grooves 113 are defined in first surface 111. The side plate 12 is connected to the first surface 111 of one of the substrates 11. Each of the fibers 13 is fixed in a positioning groove 113. Each substrate 11 can act as a cover plate for covering the adjacent substrate 11. Therefore, cover plates for the substrate 11 are unnecessary. The number and density of fibers 13 that can be accommodated in fiber array unit 10 is increased beyond those of conventional fiber array units. Thus, the fiber array unit 10 provided increased data throughput and space-saving advantages.

It is to be understood, however, that even through numerous characteristics and advantages of the present disclosure have been set fourth in the foregoing description, together with details of assembly and function, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. A fiber array apparatus, comprising:
   a packaging plate, and
   a fiber array unit mounted on the packaging plate, the fiber array unit comprising:
   a plurality of substrates arranged and connected in an array;
   a side plate arranged at one side of the plurality of substrates and connected to one of the plurality of substrates; and
   a plurality of fibers;
   wherein each substrate comprises a first surface and a second surface arranged at a side of the substrate opposite the first surface, and the first surface defines a plurality of positioning grooves and at least one receiving groove for receiving adhesive, each positioning groove being of a uniform width, and a width of the at least one receiving groove being greater than the width of a positioning groove; and
   wherein the side plate is connected to the first surface of one of the substrates, and each fiber is fixed to and held by one positioning groove.

2. The fiber array apparatus as claimed in claim 1, wherein the substrates are parallel to each other, and the substrates and the side plate are arranged in a row.

3. The fiber array apparatus as claimed in claim 1, wherein the positioning grooves in each of the substrates are arranged at equal spacing from one another, and each of the positioning grooves has a V-shaped cross-section.

4. The fiber array apparatus as claimed in claim 1, wherein the at least one receiving groove has a rectangular cross-section.

5. The fiber array apparatus as claimed in claim 1, wherein two receiving grooves are defined at the first surface, and the positioning grooves are arranged between the two receiving grooves.

6. The fiber array apparatus as claimed in claim 1, wherein the second surface is planer, the first surface of each of the substrates is connected to the second surface of an adjacent substrate or the side plate, whereby the positioning grooves are covered by the second surface of the adjacent substrate or the side plate.

7. The fiber array apparatus as claimed in claim 1, wherein the packaging plate has an inner sidewall defining a through hole, and a frame extending from the inner sidewall of packaging plate towards the through hole, the side plate and the plurality of the substrates are mounted on the frame.

8. The fiber array apparatus as claimed in claim 1, wherein the fiber array apparatus further comprises a spacing plate and a lens plate, the spacing plate is connected to one side of the packaging plate away from the fiber array unit, and the lens plate is connected to one side of the spacing plate away from the packaging plate.

9. The fiber array apparatus as claimed in claim 8, wherein the fiber array apparatus further comprises a first adhesive layer and a second adhesive layer positioned between the packaging plate and the fiber array unit, the first adhesive layer is rectangular, frame shaped, and arranged around a peripheral portion of the substrates and the side plate, and the second adhesive layer is arranged at one side of the packaging plate spaced from the spacing plate.

10. The fiber array apparatus as claimed in claim 1, wherein the fiber array apparatus further comprises a protective cover, the protective cover is connected to the packaging plate and configured for surrounding the plurality of the fibers.

* * * * *